Feb. 2, 1960 L. CAMPAGNA 2,923,059
DRAINING SPOON
Filed April 23, 1958

INVENTOR.
LOUIS CAMPAGNA.
BY
Brown, Critchlow, Flick & Peckham
his
ATTORNEYS.

United States Patent Office 2,923,059
Patented Feb. 2, 1960

2,923,059
DRAINING SPOON

Louis Campagna, Pittsburgh, Pa.

Application April 23, 1958, Serial No. 730,287

3 Claims. (Cl. 30—325)

This invention relates to spoons, and particularly those adapted for use in separating solid particles from liquids, or for mixing liquids.

A particular object of my invention is to provide a spoon that will readily and effectively separate solids from liquids, such as seeds from orange or grapefruit or grape juice, pulp of tomatoes, or the like. That is done by allowing the juice to pass through and under the spoon with relatively greater freedom from clogging than with ordinary spoons.

The spoon described may be stamped, forged, molded, or cast, from any suitable metal, as for example stainless steel, aluminum, silver, brass, etc. The particular method of making the spoon and the material is not a part of my invention.

Referring to the drawings.

Figure 1:
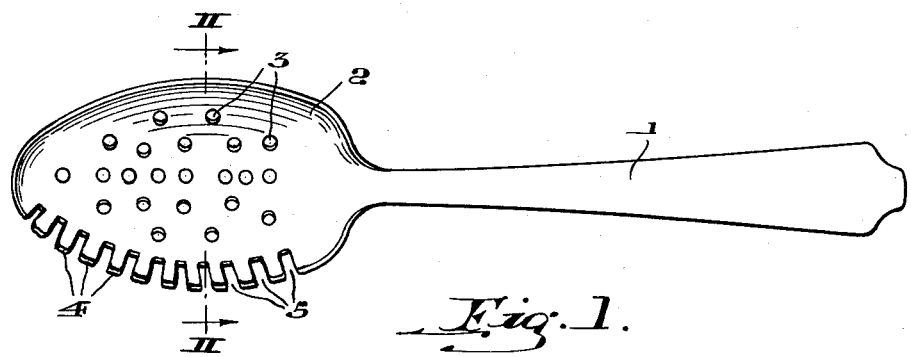
Fig. 1 is a plan view of the spoon.
Figure 2:
Fig. 2 is a section on the line II—II of Fig. 1.

The spoon comprises a handle or shank 1 and a bowl 2. The bowl is provided with a plurality of liquid-passage perforations 3 in its median portion, as shown. One edge of the bowl is provided with parallel sided serrations or teeth 4, providing open liquid-passage slot-like gaps 5 between the teeth.

Figure 3:
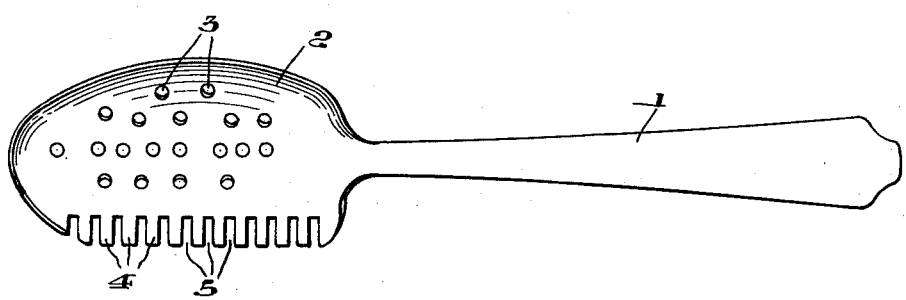
Fig. 3 shows a modification having a modified serrated edge.

Fig. 3 shows the spoon with a side in which the free ends of the teeth are aligned so that all of them may contact the bottom or side of a vessel, whereby to scrape up or comb more seeds or other solids to be separated from a juice or other liquid, without escape under the spoon.

The free end of the bowl of my spoon is rounded and smooth so that it may be used for eating, or tasting, if that be desired.

Where a spoon with a plain bowl is used to pick out seeds from orange juice, for example, the juice flows around the bowl and some seeds are carried with the current. Also if perforations alone are provided in a spoon so used, the seeds quickly cover the holes in the bowl and make the picking out of seeds or other solids more difficult. With my spoon the liquid not only escapes through the perforations in the bowl, but more freely escapes under the spoon through the gaps 5. Thus my spoon more efficiently separates solids from liquids.

In the modification shown in Fig. 3 all the teeth of the serrated edge of the spoon may contact or come close to the wall of a receptacle, thereby scraping up and collecting solids with a minimum of escape around or under the serrated edge of the bowl.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A spoon adapted for eating, tasting, and for separating solid particles such as seeds from a liquid such as a fruit juice, comprising a handle and a bowl, the bowl having a rounded smooth end and having gap-forming rectangular teeth along one entire side adapted to comb solid particles from the wall of a vessel containing a mixture of liquid and solids, the bowl having a plurality of perforations in its median portion to permit escape of liquid through the bowl while collecting solids for removal from the liquid.

2. A spoon adapted for eating, tasting, and for separating solids from liquids comprising a handle and a bowl, the bowl having a rounded smooth end and one straight side provided with rectangular teeth forming liquid-passage gaps between the teeth, the bowl having in its median portion liquid-escape perforations, the toothed side of the bowl being adapted to comb solids from the wall of a vessel containing a mixture of solids and a liquid, the perforations being adapted to permit free passage of liquid through the bowl of the spoon.

3. A combined eating, tasting, straining and scraping spoon for separating seeds from fruit juice, comprising a handle and an integral elongated bowl, the bowl having a rounded smooth end and perforations in its median portions adapted to permit passage of juice through the bowl, one side of the bowl being straight and having parallel rectangular teeth with deep open slot-like gaps between the teeth whereby seeds may be scraped from the bottom or side of a vessel and separated from the liquid juice without removing juice from the basin.

References Cited in the file of this patent

UNITED STATES PATENTS

| D. 136,343 | Gamache | Sept. 14, 1943 |
| 15,266 | Lincoln | July 1, 1856 |
| 159,545 | Hagerty | Feb. 9, 1875 |
| 631,713 | Goodwin | Aug. 22, 1899 |
| 885,444 | Cram | Apr. 21, 1908 |
| 1,044,869 | Emmenegger | Nov. 19, 1912 |
| 2,647,310 | Yolles | Aug. 4, 1953 |
| 2,778,109 | Haynes | Jan. 22, 1957 |